(12) United States Patent
Oren (10) Patent No.: US 7,014,253 B2
(45) Date of Patent: Mar. 21, 2006

(54) SIDEWALL CONSTRUCTION AND METHODS OF MAKING THE SAME

(75) Inventor: David D. Oren, 6977 Black Duck Dr., Lino Lakes, MN (US) 55014

(73) Assignee: David D. Oren, Lino Lakes, MN (US)

( * ) Notice: Subject to any disclaimer, the term of this patent is extended or adjusted under 35 U.S.C. 154(b) by 0 days.

(21) Appl. No.: 10/823,505

(22) Filed: Apr. 12, 2004

(65) Prior Publication Data

US 2005/0225118 A1    Oct. 13, 2005

(51) Int. Cl.
*B60J 5/00*    (2006.01)

(52) U.S. Cl. .................. 296/186.1; 296/191; 52/780

(58) Field of Classification Search ............... 296/191, 296/181.1, 181.6, 182.1, 186.1; 52/580, 52/780, 586.1, 762–764

See application file for complete search history.

(56) References Cited

U.S. PATENT DOCUMENTS

| | | | |
|---|---|---|---|
| 3,393,920 A * | 7/1968 | Ehrlich | 296/181.6 |
| 4,015,876 A * | 4/1977 | Hulverson et al. | 296/184.1 |
| 5,562,981 A | 10/1996 | Ehrlich | |
| 6,199,939 B1 | 3/2001 | Ehrlich | |
| 6,220,651 B1 | 4/2001 | Ehrlich | |
| 6,336,298 B1 * | 1/2002 | Chou | 52/238.1 |
| 6,412,854 B1 * | 7/2002 | Ehrlich | 296/191 |
| 6,652,019 B1 | 11/2003 | Bennett | |
| 2002/0109377 A1 * | 8/2002 | Ehrlich | 296/191 |
| 2004/0256887 A1 * | 12/2004 | Buchholz et al. | 296/186.1 |

* cited by examiner

*Primary Examiner*—Patricia L. Engle
(74) *Attorney, Agent, or Firm*—Merchant & Gould, PC (57) ABSTRACT

A semi-trailer sidewall construction includes a horizontally aligned base rail, a horizontally aligned top rail, a plurality of vertical posts coupled between the top and bottom rails at spaced apart intervals along a length of the top and bottom rails, a plurality of outside panels coupled between the top and base rails, and a plurality of inside panels coupled between the top and bottom rails. The vertical posts include first and second thicknesses with the first thickness being less than the second thickness. Separate outside panels are coupled to pairs of vertical post within the spaced apart intervals, and separate inside panels are coupled to pairs of vertical post within the spaced apart intervals. The outside and inside panels are spaced apart a distance defined by the first post thickness.

36 Claims, 10 Drawing Sheets

SIDEWALL CONSTRUCTION AND METHODS OF MAKING THE SAME

BACKGROUND OF THE INVENTION

1. Field of the Invention

The present invention generally relates to trailers, and more particularly relates to semi-trailer sidewall constructions and methods of making the same.

2. Related Art

There are at least three known semi-trailer sidewall constructions commonly in use that have some similarity in design. These trailer sidewall constructions include a shaped aluminum post spaced between a plurality of panels. The posts are also installed between the panel joints on the panel to give the wall added strength. One construction includes posts that are exposed on the exterior of the trailer and the panels are abutted end-to-end to provide a flush panel arrangement on the interior side of the trailer. This construction may require relatively thick posts (about 1–2 inches), has a single wall of moisture resistance material, has a normal level of strength and durability, is not easy to decal because of the exposed posts, has less marketability as the market desires smooth sided trailers, and has large amounts of wind resistance from the exposed posts.

Another construction includes posts that are exposed on the interior of the trailer and the relatively thin panels are abutted end-to-end to provide a flush panel arrangement on the exterior side of the trailer. In this construction, the posts are covered on the interior of the trailer with plywood or other protective material and the posts are about ½–2 inches thick to provide the necessary strength and stiffness. This construction requires lining to make the inside of the trailer sidewall flush. As the wall becomes thinner the number of posts needed and/or the required strength of each post must increase, making the thin wall versions of the interior post trailers become quite heavy. The interior lining on interior post trailers are can be a source of extra maintenance. Also this type of trailer normally requires scuff liner at the floor to protect the interior liner that adds weight and cost and is a source of extra maintenance. Both exterior post and interior post trailers draw much of their sidewall strength from the posts.

A further construction comprises a composite panel consisting of a sheet of metal chemically bonded to a plastic filler and then another sheet of metal bonded to the plastic filler. Composite trailers do not require posts. The multilayered panels have an inherent stiffness and strength that eliminate the need for supporting posts. This configuration has several disadvantages including difficulty to repair, possibly heavier than other sidewall constructions depending on the wall thickness of the composite panel, and the panels are much more complicated to build and require a very special manufacturing process to bind the metal to the plastic core.

A semi-trailer sidewall construction that addresses these and other disadvantages of known sidewall constructions would be an advance in the art.

SUMMARY OF THE INVENTION

The trailer design of the present invention utilizes sidewall panels that work in compression and tension loading and are located at the maximum sidewall thickness to improve the utilization of the sidewall material strength. The present invention is also capable of utilizing conventional materials such as aluminum or steel sheet metal as the outer and inner walls. One aspect of the invention relates to a semi-trailer sidewall construction that includes a horizontally aligned base rail, a horizontally aligned top rail, a plurality of vertical posts coupled between the top and bottom rails at spaced apart intervals along a length of the top and bottom rails, a plurality of outside panels coupled between the top and base rails, and a plurality of inside panels coupled between the top and bottom rails. The vertical posts include first and second thicknesses with the first thickness being less than the second thickness. Separate outside panels are coupled to pairs of vertical post within the spaced apart intervals, and separate inside panels are coupled to pairs of vertical post within the spaced apart intervals. The outside and inside panels are spaced apart a distance defined by the first post thickness.

Another aspect of the invention relates to a trailer panel construction that includes a post and first and second panels. The post includes first and second opposing sides that each includes a recessed portion and a non-recessed portion. The post also includes a first thickness defined between the recessed portions and a second thickness defined between the non-recessed portions. The first panel member includes opposing primary surfaces and the first panel is coupled to the post in the recessed portion of the first side of the post. The second panel member includes opposing primary surfaces and the second panel is coupled to the post in the recessed portion of the second side of the post. The primary surfaces of the first and second panels that are facing each other are spaced apart a distance substantially equal to the first post thickness, and the primary surfaces of the first and second panels that are facing away from each other are spaced apart a distance substantially equal to the second post thickness.

Another further aspect of the invention relates to a trailer panel assembly that includes a plurality of inside panels and a plurality of outside panels that are coupled together as pairs of inside and outside panels in a spaced apart orientation with an air gap there between. The plurality of inside panels are positioned side-by-side without overlapping an adjacent inside panel, and the plurality of outside panels are positioned side-by-side without overlapping an adjacent outside panel.

Another aspect of the invention relates to a trailer panel assembly that includes a plurality of inside panels and a plurality outside panels positioned in a spaced apart orientation thereby defining an air gap between the inside and outside panels. The plurality of inside panels are positioned side-by-side in an overlapping arrangement and the plurality of outside panels are positioned side-by-side in an overlapping arrangement. The assembly also includes a joining post positioned in the air gap and configured for coupling the plurality of inside panels to the plurality of outside panels.

A still further aspect of the invention relates to a method of assembling a semi-trailer sidewall construction that includes inside and outside panels and a post. The method includes forming the post with a reduced thickness portion, and mounting the inside and outside panels to the post at the reduced thickness portion, wherein the reduced thickness portion defines a spacing between the inside and outside panels.

Another aspect of the invention relates to vertical post suited for use with a semi-trailer sidewall construction. The post includes inside and outside primary surfaces and at least one recessed portion formed in each of the inside and outside primary surfaces. The recessed portions are configured to receive panels of the sidewall construction in a substantially flush mounted arrangement relative to the inside and outside primary surfaces of the post. Another post construction according to principles of the present invention includes at least one recessed portion formed in the post between the inside and outside primary surfaces. The recessed portion defines a first reduced thickness portion of the post and the first reduced thickness portion is adapted and configured for being inserted between inside and outside panels of a sidewall construction to define a mounting surface and a spacing between the inside and outside panels.

The above summary of the present invention is not intended to describe each disclosed embodiment or every implementation of the present invention. The Figures and the detailed description that follow more particularly exemplify embodiments of the invention. While certain embodiment of the invention will be illustrated in describing embodiments of the invention, the invention is not limited to use in such embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention generally relates to trailer sidewall constructions, and more particularly relates to semi-trailer sidewall constructions and methods of making the same. The sidewall construction of the present invention may be generally referred to as a "wafer" design that includes spaced apart outer and inner panels and a post that connects and spaces apart the panels. The panels and posts are preferably flush mounted with each other at the connecting point. In some configurations, portions of the posts may be exposed on either the outside or inside of the sidewall construction. The posts may also have a hollow core and recessed portions extending through an exposed surface of the post to provide access to the hollow core. The sidewall construction may also include flashing and transition structures interposed between the top and bottom rails and between the post and panels of the construction.

The "wafer" design of the example sidewall constructions disclosed herein may have several advantages. For example, a wafer design may provide improved resistance to torsion and bending forces applied to the sidewall construction while minimizing the amount of material required. Using less material to provide the same or more strength in a sidewall construction reduces material costs and the overall weight of the sidewall construction as compared to non-wafer configurations. Another advantage relates to the flush mounted arrangement of the posts, panels, and top and bottom rails of the sidewall construction. By eliminating overlapping structures that would otherwise eliminate a flush mounting arrangement, the resultant outer exposed surfaces of the sidewall construction are relatively smooth as compared to other sidewall constructions with overlapping structures that result in an uneven surface. A still further advantage of the present invention is the potential ease in manufacturing and assembling the sidewall construction. The sidewall construction preferably use standard panel sizes having standard thicknesses and dimensions, and the posts, rails and fasteners may be made from common materials using common techniques such as extruded aluminum processes all of which contribute to a relatively simple assembly of the sidewall construction. A further advantage is the ease of maintenance and accident repair. Most trailer repair shops already have the common-sized panels used for the present invention in stock and also have the skill levels necessary to maintain and repair this wafer-type wall, as opposed to other sidewall designs such as the composite style sidewall design.

Figure 1:
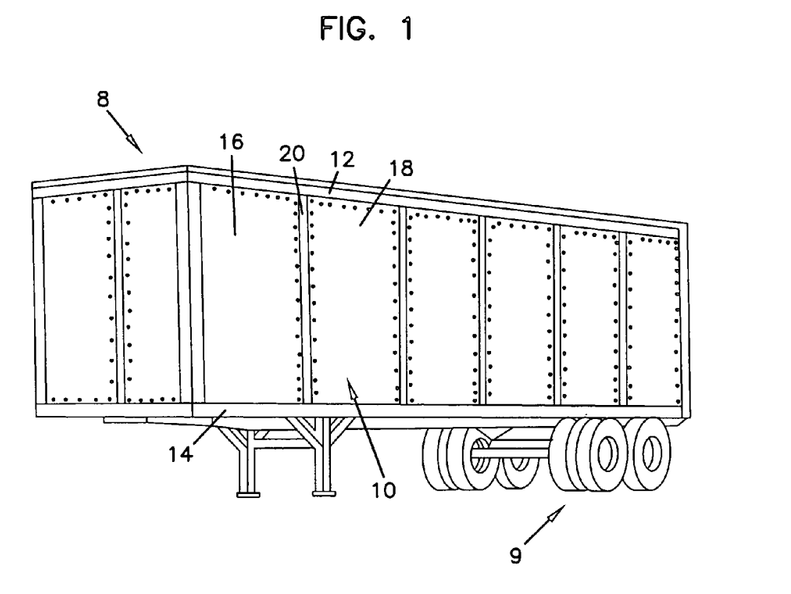
FIG. 1 is perspective view of an example semi-trailer that includes a sidewall one sidewall construction embodiment according to principles of the present invention.

An example semi-trailer 8 that includes a sidewall construction 10 according to the principles of the invention is shown in FIG. 1. The trailer 8 is supported by several pairs of wheels 9 and the sidewall construction 10 includes a top rail 12, a bottom rail 14, outer panels 16 and 18, and a joining post 20. The trailer 8 also includes additional panels and joining posts (not identified) that are positioned along the opposing side and front ends of the trailer and along inner sides of the trailer 8.

Figure 2:
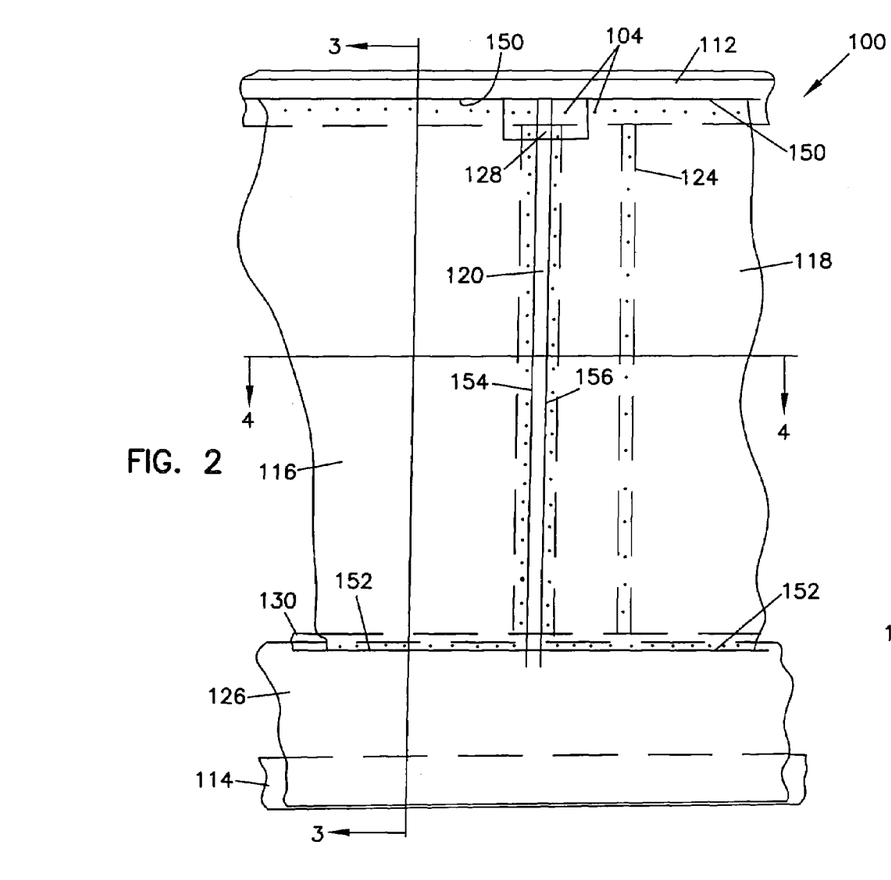
FIG. 2 is a front view of another example semi-trailer sidewall construction according to principles of the present invention.
Figure 3:
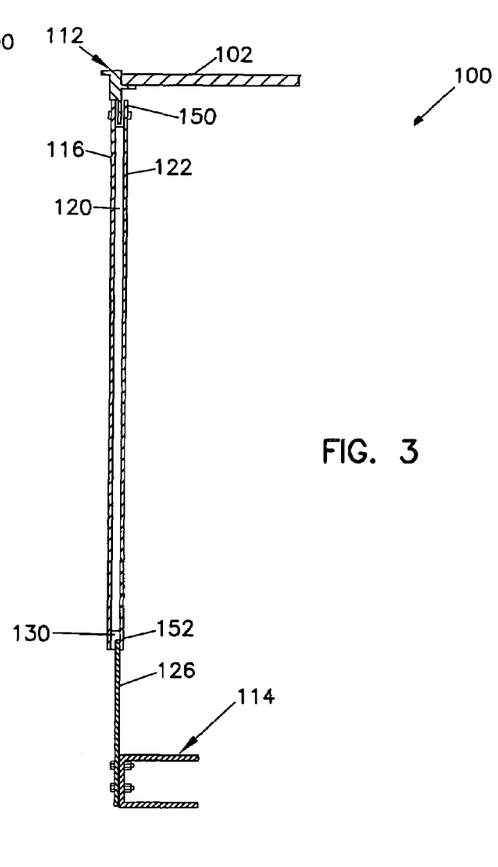
FIG. 3 is a cross-sectional view of the sidewall construction shown in FIG. 2 taken along cross-sectional indicators 3—3.
Figure 4:
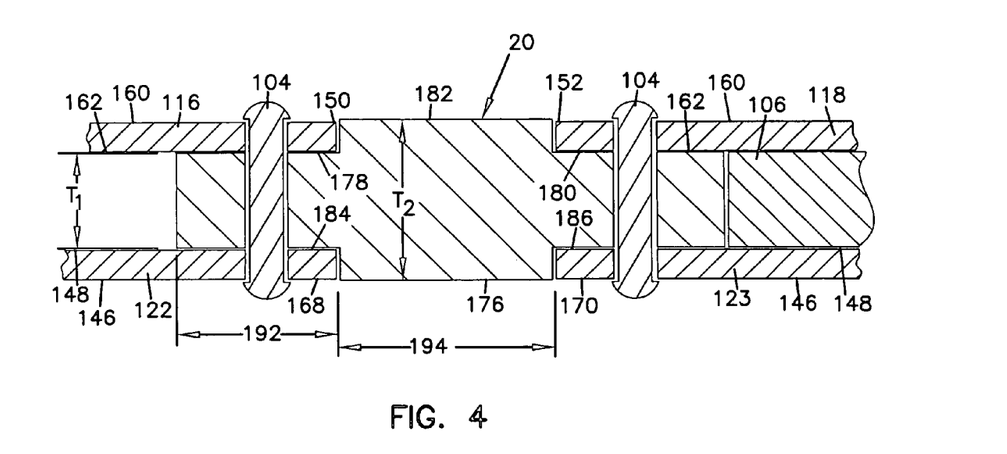
FIG. 4 is a partial cross-sectional top view of the sidewall construction shown in FIG. 2 taken along cross-sectional indicators 4—4.
Figure 5:
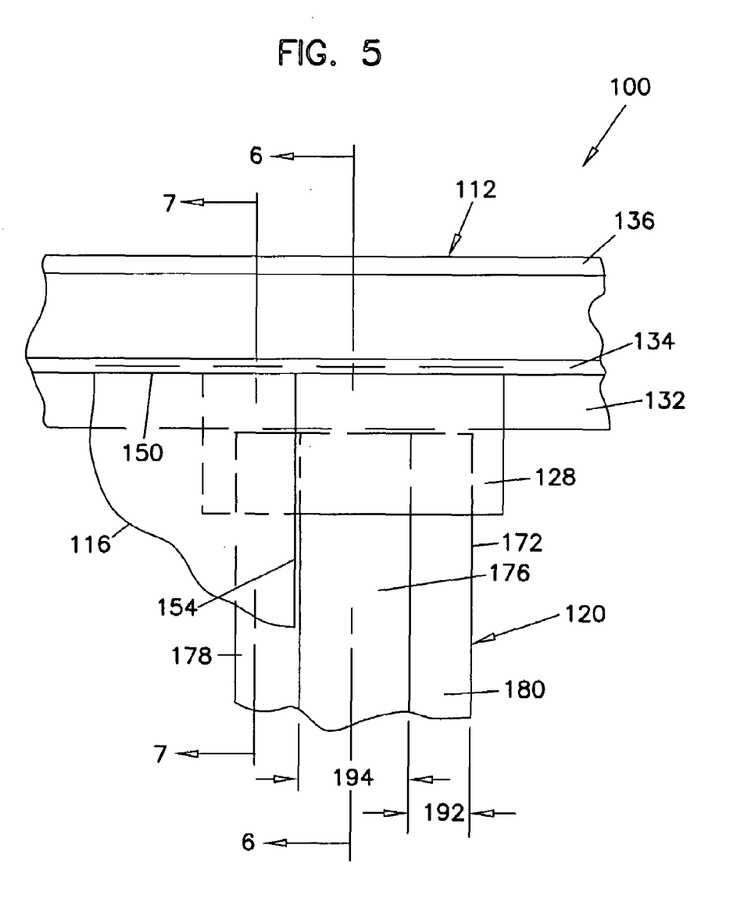
FIG. 5 is a partial close up view of the top rail assembly shown in FIG. 2.
Figure 6:
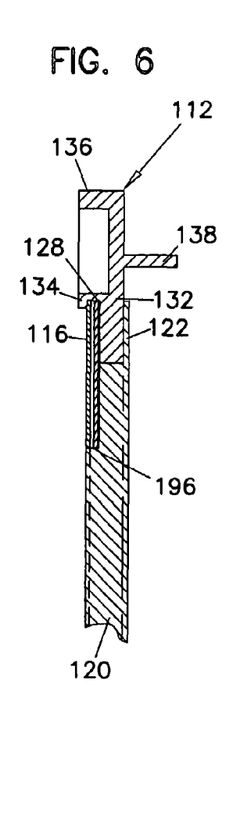
FIG. 6 is a cross-sectional view of the top rail assembly shown in FIG. 5 taken along cross-sectional indicators 6—6.
Figure 7:
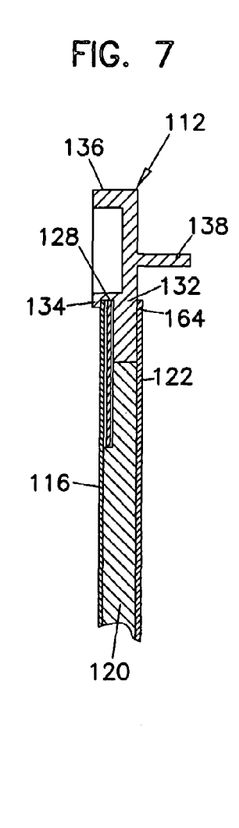
FIG. 7 is a cross-sectional view of the top rail assembly shown in FIG. 5 taken along cross-sectional indicators 7—7

Another example sidewall construction 100 is shown with reference to FIGS. 2–8. FIG. 2 illustrates the sidewall construction in a partial cutaway view. The sidewall 100 includes a top rail 112, a bottom rail 114, first and second outside panels 116, 118, a joining post 120, a bottom plate 126, a top flashing member 128, a bottom transition rail 130, and a plurality of fasteners 104. FIG. 2 also shows in phantom an intermediate post 124 that is positioned between panels 118 and 123. FIG. 3 illustrates an additional roof panel 102. FIG. 4 illustrates first and second inside panels 122, 123.

Referring now to FIGS. 3 and 5–7, the top rail 112 includes a wall insert 132, a rain guard 134, a roof sheet attachment leg 136, and roof support 138. The wall insert 132 is sized to fit between the pairs of outside and inside panels 116, 122 and 118, 123 and provides positive attachment between the panels and the roof structure of the semi-trailer. The rain guard 134 may be some type of raised lip or covering structure that helps to shield liquids from entering into the wall structure between the pairs of panels 116, 122 and 118, 123. The rain guard 134 may be integrally formed into the top rail 112 or may be a feature made from a different material that provides improved sealing characteristics as compared to the material composing the rest of the top rail 112. The roof sheet attachment leg 136 allows for roof attachment on the outside of the trailer to reduce the possibility of water leakage at the attachment points. The roof support 138 may be used to support a roof bow 102 as shown in FIG. 3, and may have any desired construction suitable for supporting the semi-trailer roof.

Figure 8:
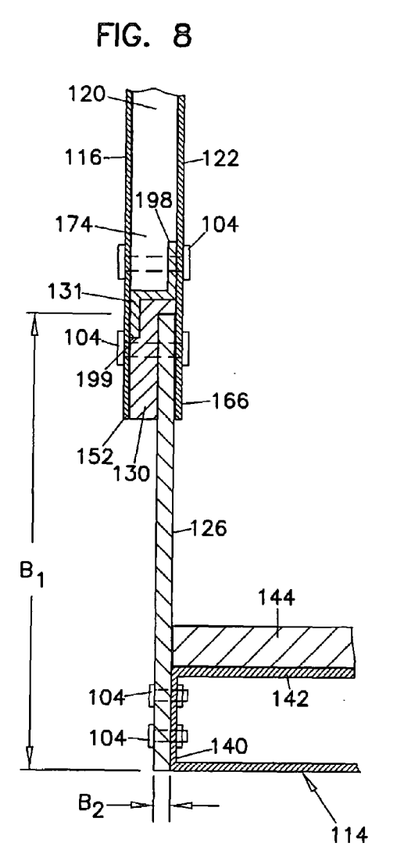
FIG. 8 is a close up view of the bottom rail assembly shown in FIG. 3 including a tall bottom rail.

Referring now to FIGS. 3 and 8, the bottom rail 114 includes an outer face 140, a flooring support 142, and may include an additional flooring member 144. The outer face 140 is configured for mounting the bottom plate 126 so as to support the panels and posts of the wall construction. A plurality of fasteners 104 may be used to secure the bottom plate 126 to the bottom rail 114. The bottom rail 114 may be integral with a flooring structure and other supporting structures such as, for example, the trailer frame (not shown). The flooring member 144 may be separately secured to the flooring support 142 and may be a replaceable member if desired.

Referring now to FIGS. 2–8, the first and second outside panels 116, 118 each include an outer surface 146, an inner surface 148, top and bottom ends 150, 152, and first and second sides 154, 156. The outer surface 146 preferably faces outside the semi-trailer and the inner surface 148 faces into the enclosed cavity defined between the inside and outside panels. The top end 150 abuts against the top rail 112 and the bottom end 152 is positioned adjacent to the bottom plate 126 or bottom rail 114. First and second sides 154, 156 are aligned with the joining post 120 (see FIGS. 2 and 4).

The first and second inside panels 122, 123 similarly include outer and inner surfaces 160, 162, top and bottom ends 164, 166, and first and second sides 168, 170. The inner surfaces 162 face the inner cavity defined between the outside and inside panels, and the outer surfaces 160 face the inner volume of the semi-trailer. The first and second sides 168, 170 are aligned with joining post 120 (see FIG. 4).

The inside and outside panels of the wall construction 100 may include any desired material having any desired thickness. In one example, the side panels are made from 0.05 inch thick aluminum or steel sheets having dimensions of about 49 inches by 108 inches depending on the height of the top and bottom rails, the tire size, and the trailer inside height required. Some sidewall constructions may include panels with different dimensions for certain heights and lengths of a semi-trailer to provide panels having equal sizes along the entire length or width of the trailer. The posts could be made from steel, aluminum, plastic, or other high strength or low weight material, or a combination of the preceding materials.

Referring again to FIGS. 2–8, the joining post 120 includes first and second ends 172, 174, an outer face 176 having first and second recessed portions 178, 180, an inner face 182 having first and second recessed portions 184, 186, and a top flashing recess 196. The outer and inner recesses 178, 180, and 184, 186 are generally aligned in opposed positions thereby defining a recessed thickness T1. The remaining portion of the joining post 120 (where the outer and inner faces are exposed) has a thickness T2 (see FIG. 4). Preferably each of the recesses 178, 180, 184, 186 has a depth equal to approximately the thickness of the outer and inner panels 116, 118, 122, 123 such that the thickness T1 plus the thickness of an outside panel and an inside panel is substantially equal to T2. This configuration provides for a generally flush mounted arrangement of the panels relative to the joining post as shown in FIG. 4.

In order to maintain this flush mounting arrangement, the depth of each of the recesses 178, 180, 184, 186 should be modified if the thickness of the panel associated with that recess is modified. For example, if the first outer outside panel 116 has a thickness of 0.08 inches and the first inner panel 122 has a thickness of 0.02 inches, the recessed depth of the respective recesses 178, 184 must also be, respectively, 0.08 inches and 0.02 inches. To maintain a constant spacing between the inside and outside panel along the entire length of the panels, the thickness T1 of joining post 120 is preferably substantially the same as the thickness of the wall insert 132 of the top rail 112 and the same thickness as the combined bottom panel 126 and bottom transition rail 130.

The flashing recess 196 (see FIGS. 6 and 7) may be formed in the outer face 176 at the top end 172 of the joining post 120 so as to facilitate flush mounting of the flashing member 128. The flashing member 128 may be used to cover the otherwise exposed joint between the top end 172 and the joining post 120 and the end of the wall insert 132 of the top rail 112. The flashing member 128 is preferably wide enough to also extend between the wall insert 132 and the first and second outer panels 116, 118, as shown in FIGS. 2 and 5–7.

The joining post 120 and the intermediate post 124 are preferably made from a relatively lightweight material such as aluminum that is formed using common extrusion or casting processes. Any other desired materials or processes may be used to form the posts 120, 124, for example, iron, iron alloys, composites or polymer materials and processes such as casting and molding. The shape and construction of an example intermediate post is further described with reference to sidewall construction 400 shown in FIGS. 11–13.

The bottom plate 126 includes a height B1 and a thickness B2 as shown in FIG. 8. The height B1 may be modified to provide varying amounts of strength and support to the sidewall construction. For example, the height B1 may be about 2 feet so as provide additional strength and scuff resistance at an inward facing, bottom portion of the sidewall construction that is typically susceptible to high amounts of stress and wear from loading the trailer. The thickness B2 is preferably less than the recessed thickness T1 of the joining post 120 so as to allow the bottom plate 126 to be inserted between the inside and outside panels 116, 122 and 118, 123 adjacent to the bottom transition rail 130. The bottom plate 126 preferably is made from a high strength, wear resistant material such as, aluminum, aluminum alloys, steel or various iron alloys, polymer, and carbon composites.

Figures 9, 10:
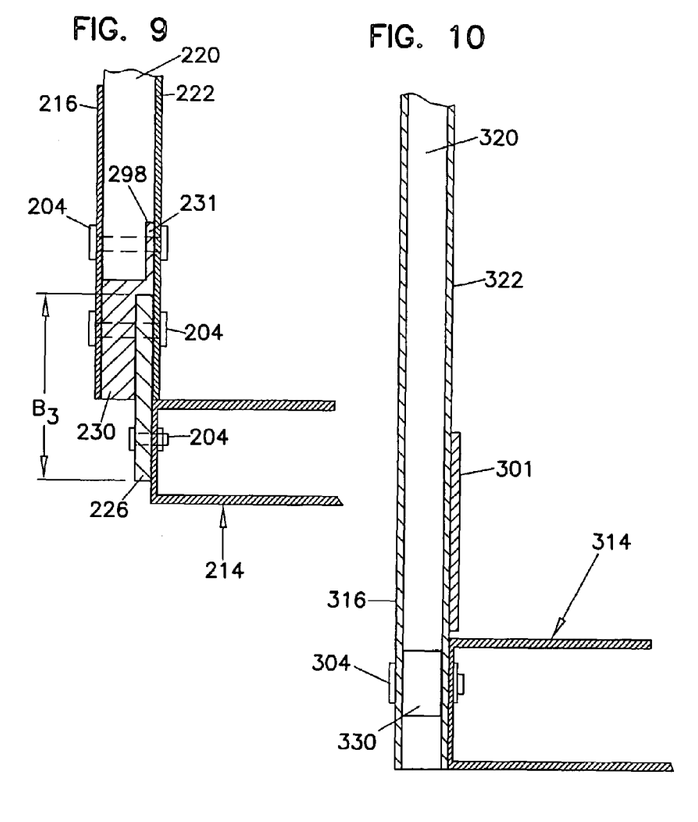
FIG. 9 is a cross-sectional view of another bottom rail assembly according to principles of the present invention including a short bottom panel.
FIG. 10 is a cross-sectional view of another bottom rail assembly according to principles of the present invention including a bottom insert.

An alternative bottom plate construction 226 is shown in FIG. 9. Bottom plate 226 has a height B3 that is sized for coupling the panels and joining post of the sidewall construction to the bottom rail 214 without providing much additional strengthen and/or scuff resistance as compared to the bottom plate 126. In still further embodiments, such as the embodiment shown in FIG. 10, the bottom plate may be substituted with a bottom insert that will fit between the outside and inside panels and the outside and inside panels and joining post may be secured directly to the bottom rail of the sidewall construction.

The bottom transition rail 130 may extend as a continuous member along the length of the semi-trailer between the bottom plate 126 and the panels 116, 122, joining post 120, and intermediate post 124 of the wall construction 10 (see FIGS. 2 and 8). The bottom transition rail 130 preferably has a maximum width substantially equal to the recessed thickness T1 of the joining post 120 and may also include a recessed portion sized to accommodate the bottom plate 126 and a flashing member 131 (see FIG. 8). Preferably, the combined thickness of the transition rail 130 and bottom plate 126 is no greater than the recessed thickness T1 of the joining post 120. The joining post 120 may include a recess 198 on an inner side that is sized to accept the thickness of the flashing 131. The transition rail 130 may also include a recess 199 that is also sized to accept the flashing 131. The recesses 198 and 199 will allow the sidewall construction 100 to maintain a uniform thickness while incorporating a water resistant flashing.

An alternative transition rail embodiment 230 (see FIG. 9) includes an integrated leg flashing portion 231 that helps cover the otherwise exposed inner face between the second end 174 of the joining post 120 and a top end of the transition rail. A bottom leg flashing recessed portion 298 formed in the second end of the joining post 220 may provide flush mounting of the flashing portion 231 within the joining post 220. A plurality of fasteners 204 may be used to secure together components of the sidewall construction 100, such as the outer panel 216, transition member 230, bottom plate 226, and inner panel 222, or to couple the bottom plate 226 to the bottom rail 214.

As noted above and described with reference to FIG. 10, some sidewall construction embodiments may not include a bottom plate or a bottom transition rail but may still require a bottom insert 330. In such an example embodiment, a fastener 304 may be used to directly secure the combined outer panel 316, inner panel 322 and joining post 320 to the bottom rail 314. A scuff plate 301 may be coupled to the inner panel 322 to provide additional strength, support, and resistance to wear that is typically desired at an inner, lower portion of the sidewall construction.

Figure 11:
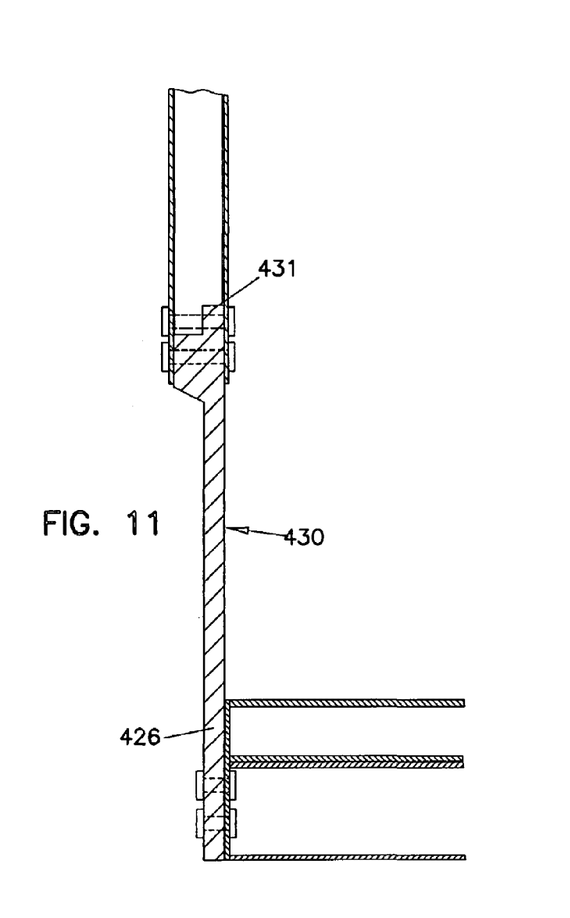
FIG. 11 is a cross-sectional view of another bottom rail assembly according to principles of the present invention that includes a tall bottom panel portion.
Figure 12:
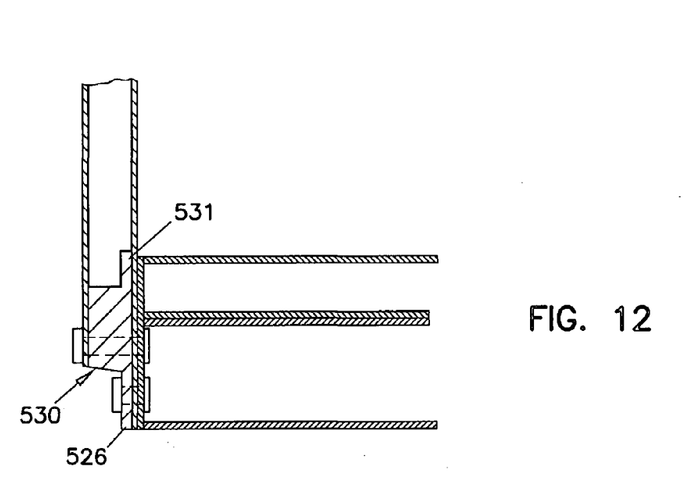
FIG. 12 is a cross-sectional view of another bottom rail assembly according to principles of the present invention that includes a short bottom panel portion.
Figure 13:
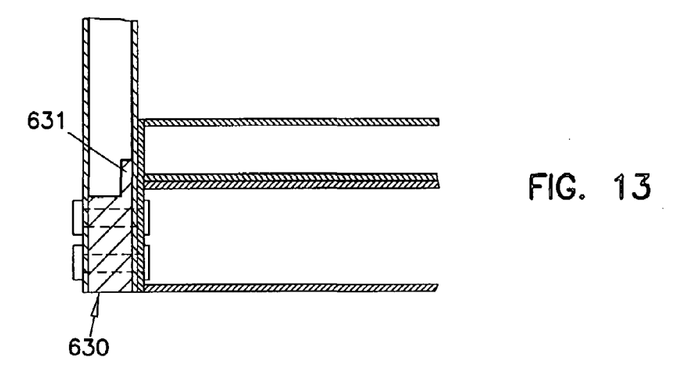
FIG. 13 is a cross-sectional view of another bottom rail assembly according to principles of the present invention that includes a single piece member.

FIGS. 11–13 show three alternative bottom rail configurations in which each bottom rail 430, 530, 630 is formed as a single piece with features of the embodiments shown in FIGS. 8–10, such as, for example, a flashing member, a bottom panel, a bottom insert, and a bottom rail. Such a single piece member 430, 530, 630 may be formed from, for example, an aluminum extrusion or another formed, molded, or caste material.

FIG. 11 illustrates bottom rail 430 having a tall bottom panel feature 426 (similar to bottom panel 126—see FIG. 8), and a flashing member feature 431. FIG. 12 illustrates bottom rail 530 having a short bottom panel feature 526 (similar to bottom panel 226—see FIG. 9) and a flashing member feature 531. FIG. 13 illustrates a bottom rail 630 having a bottom insert feature 626 (similar to bottom insert 330—see FIG. 9) and a flashing member 631. Other embodiments may include separate features that are combined with the single piece bottom rails shown in FIGS. 11–13 or other sidewall construction features described herein.

Figures 14, 15, 16:
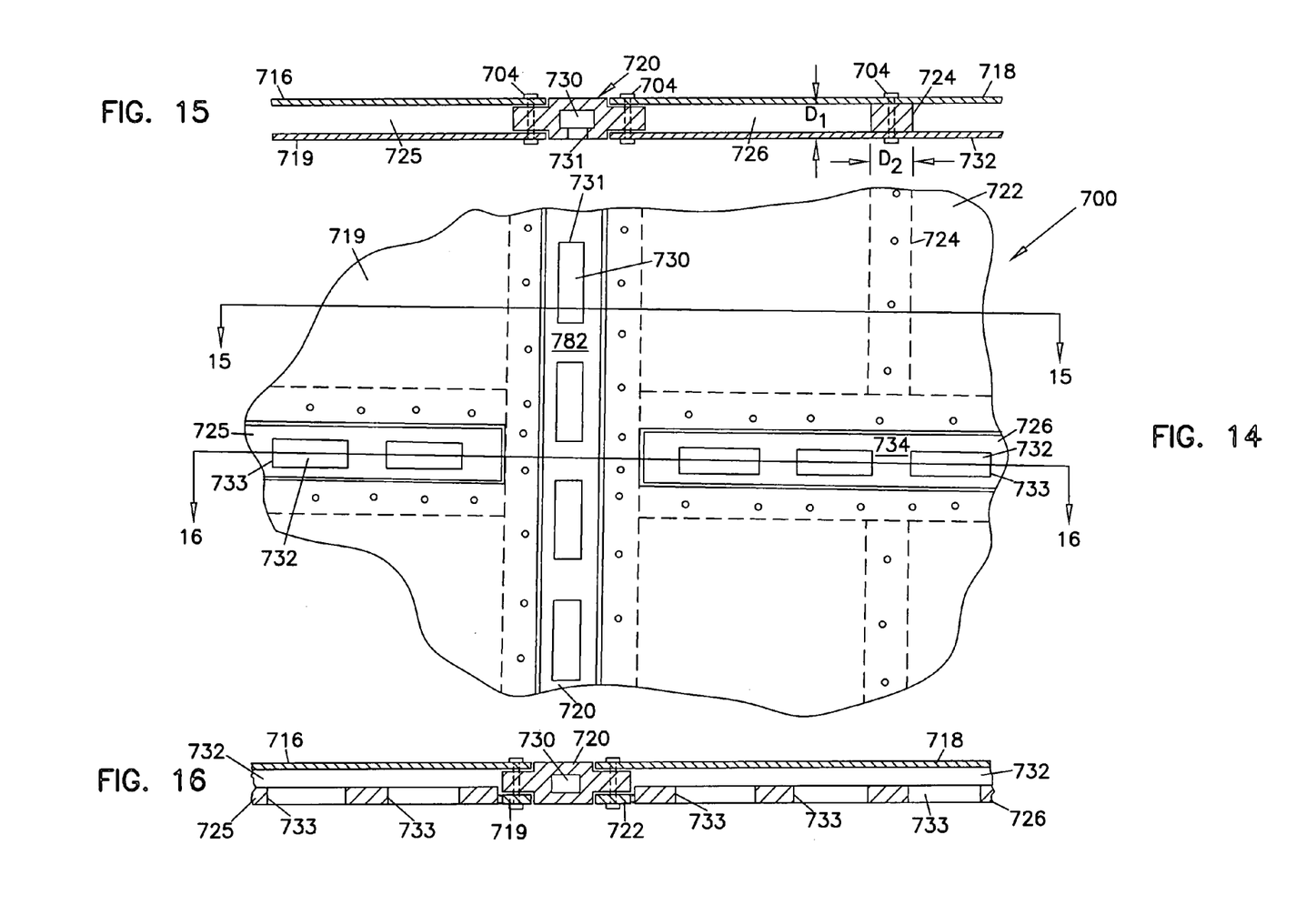
FIG. 14 is a front view of another example sidewall construction according to principles of the present invention having hollow posts and horizontal members.
FIG. 15 is a cross-sectional view of the sidewall construction shown in FIG. 14 taken along cross-sectional indicators 15—15.
FIG. 16 is a cross-sectional view of the sidewall construction shown in FIG. 14 taken along cross-sectional indicators 16—16.

Referring now to FIGS. 14–16, another sidewall construction 700 is shown and described. Sidewall construction 700 includes first and second outside panels 716, 718 (see FIG. 15), and first and second inside panels 719, 722 that are separated by a joining post 720 and first and second horizontal members 725, 726. An additional intermediate post 724 may be positioned between pairs of inside and outside panels such as between outside panel 718 and inside panel 722, as shown in FIG. 15.

The joining post 720 includes a hollow core 730 and a plurality of openings 731 formed on the inner face 782 of the posts, which openings provide access into the hollow core 730. The horizontal members 725, 726 are configured as plates having a plurality of openings into the hollow area 732 of the wall. The openings 731, 733 may provide structure for securing straps, dividers, and other support structures within the inner volume of the semi-trailer.

A plurality of fasteners 704 may be used to secure the posts 720, 724, the horizontal logistic track 725, 726, and the panels 716, 718, 719, 722 together to form the assembled sidewall construction 700.

The intermediate post 724 preferably has a thickness D1 of about the same thickness as the recessed thickness T1 of the joining post 720, and has a width D2 of preferably about 0.75 to about 1 inch, which dimensions may vary depending on the materials used and weight constraints of the sidewall construction. This embodiment does not require additional recess depths for coupling to the horizontal members 725, 726.

Figure 17:
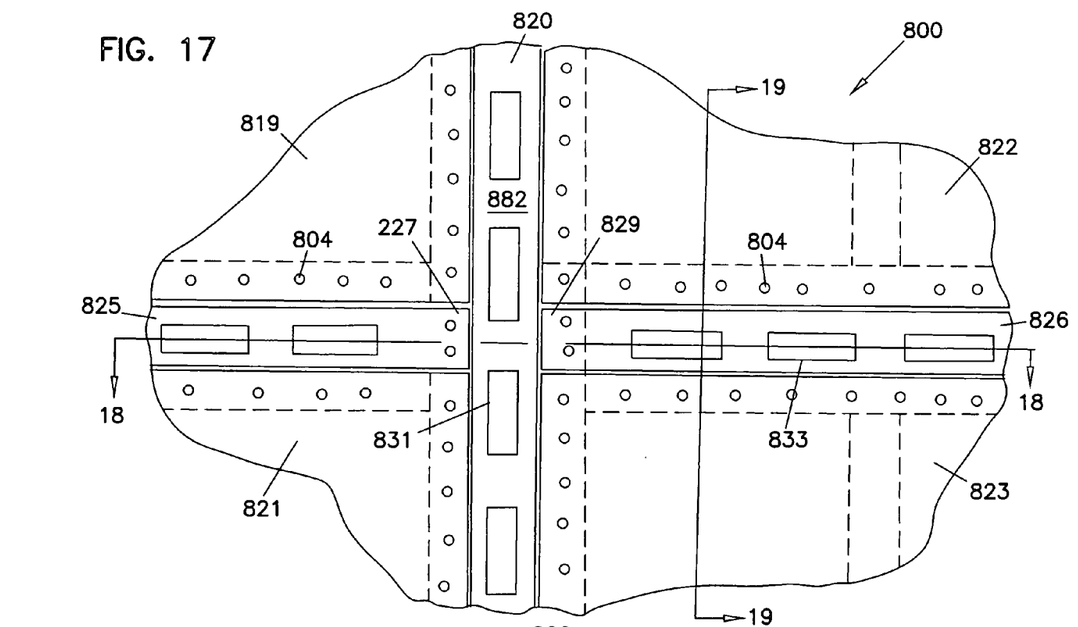
FIG. 17 is a front view of another example sidewall construction according to principles of the present invention having overlapping horizontal members.
Figure 18:
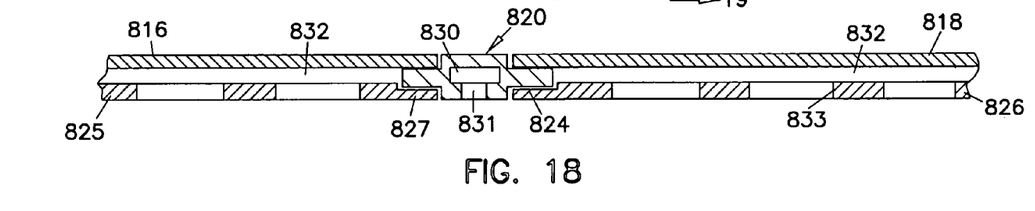
FIG. 18 is a cross-sectional view of the sidewall construction shown in FIG. 17 taken along cross-sectional indicators 18—18.
Figure 19:
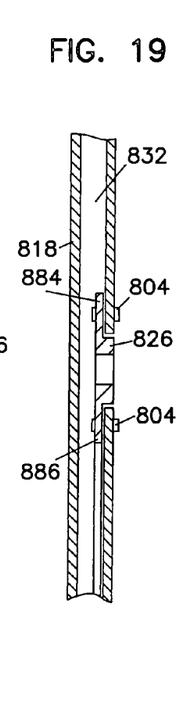
FIG. 19 is a cross-sectional view of the sidewall construction shown in FIG. 17 taken along cross-sectional indicators 19—19.

Referring now to FIGS. 17–19, another sidewall construction embodiment 800 is shown having a pair of horizontal members 825, 826 that are tied directly to the joining post 820. The overlapping ends 827, 829 of the horizontal members 825, 826 must have a thickness that is the same as the thickness of the inner sheets 819, 821, 822, 823 in order to maintain a flush mounting to the joining post 820. Otherwise, if the overlapping ends 827, 829 are thicker than the panels 819, 821, 822, 823, then the inside face 882 of the joining post 820 must include a further recesses depth sufficient to receive the overlapping ends 827, 829 of horizontal posts 825, 826. The horizontal members 825, 826 also include attachment arms 884, 886 (see FIG. 19) that provide structure for fastening the horizontal member 825, 826 to the panels 819, 821, 822, 823 using the fasteners 804. The horizontal members 825, 826 may include openings 833 into the internal space 832 between the plurality of outside panels 816, 818 and inside panels 819, 821, 822, 823, and the joining post 820 may include openings 831 that provide access into a hollow core 830 of the joining post 820.

The example sidewall construction as disclosed above may further include an insulating member, such as insulating member 106 shown in FIG. 4. The insulating member 106 may be a separate sheet of material such as, for example, a foam insert that is loose within the space defined between the inside and outside panels, or may be a layer or sheet of material that is adhered to one of the panels using, for example, adhesives, spraying, or overlaying in some fashion. An insulating member that is positively secured to one or more of the opposing panels may also function to strengthening the sidewall construction.

One example of sidewall construction includes an unrecessed thickness T2 of about 0.5 inches and a total thickness of the recessed portion T1 and panels of about 0.5 inches. The panel thicknesses in this embodiment are about 0.05 inches thick each and the recessed thickness T2 is about 0.4 inches. In this embodiment the bottom plate has a thickness of about 0.16 to about 0.19 inches. Other embodiments may have an unrecessed joining panel thickness T2 and substantially equivalent total sidewall construction thickness (T1 plus the panel thicknesses) of about 0.25 inches to about 2 inches thick.

Figure 21:
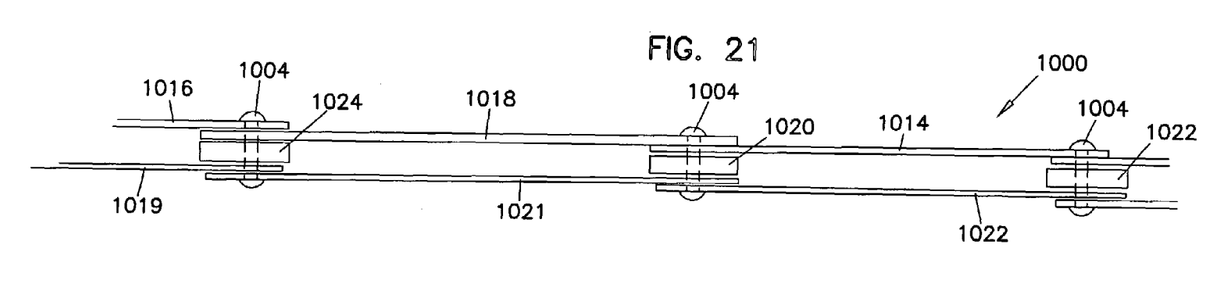
FIG. 21 is a cross-sectional view of another sidewall construction embodiment according to principles of the present invention including covered posts and overlapping panel arrangements.
Figure 22:
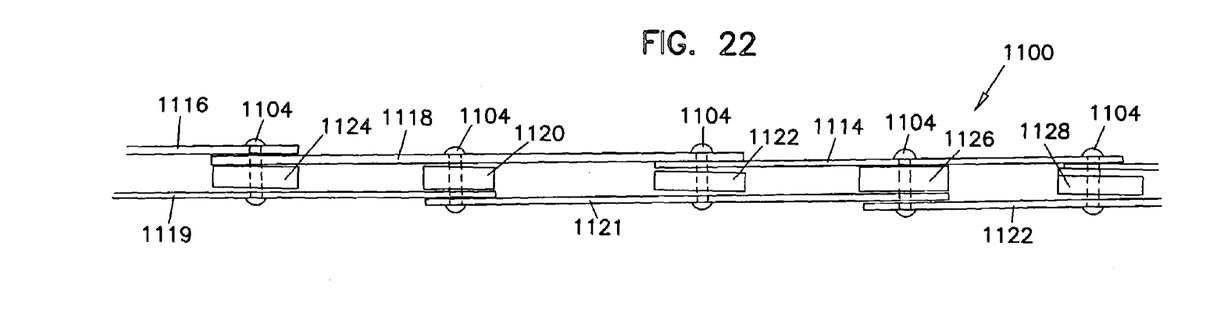
FIG. 22 is a cross-sectional view of another sidewall construction embodiment according to principles of the present invention including staggered overlapping panel arrangements.
Figure 23:
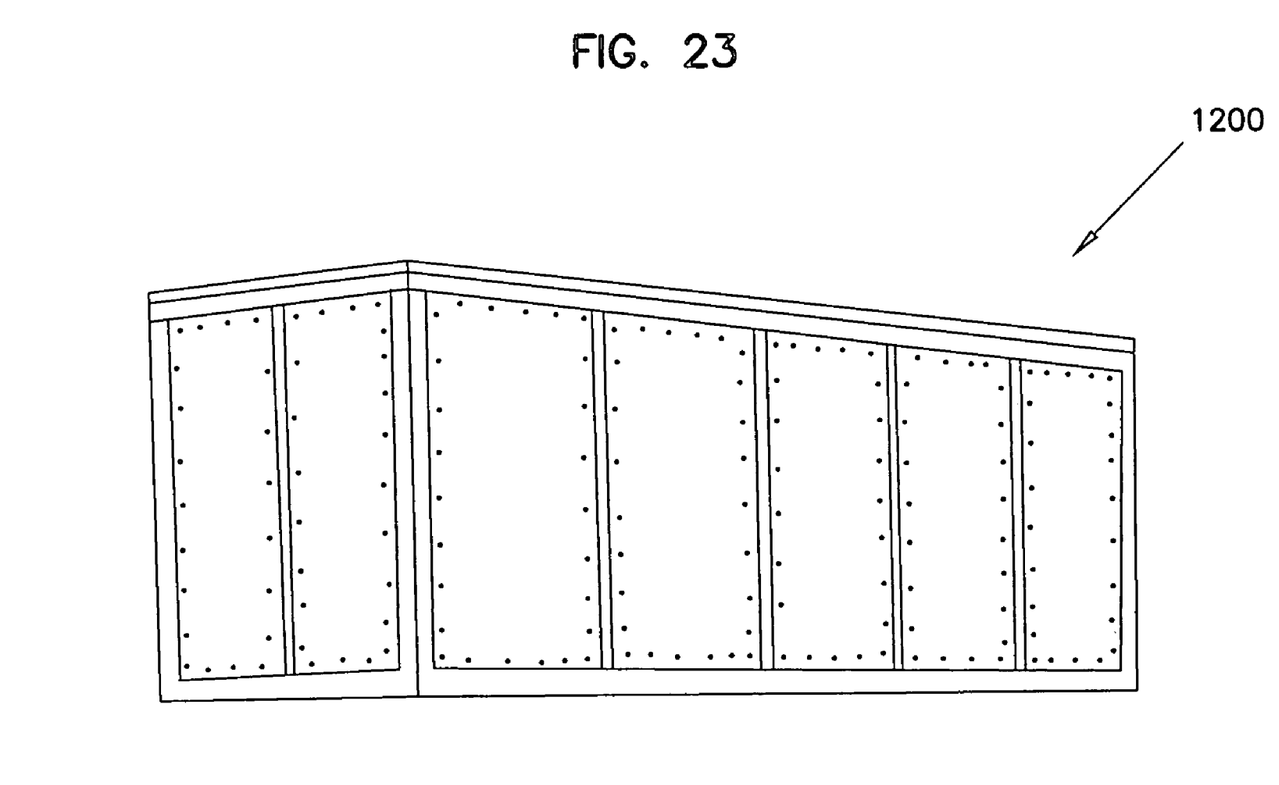
FIG. 23 is a perspective view of an example container having a sidewall construction according to principles of the present invention.

FIGS. 21–23 illustrate several alternative sidewall constructions 900, 1000, 1100 that exemplify the numerous alternative designs possible using principles of the present invention. Sidewall construction 900 (see FIG. 21) includes a first joining post 920, a second joining post 922, an intermediate post 924, outside panels 914, 916, 918, and inside panels 919, 921, 922. Sidewall construction 900 illustrates a covered post connection with a butt joint (see first joining post 920) alternating with a logistic post having exposed post surfaces and an accessible hollow core 930 (see second joining post 922), and having an intermediate post positioned between ends of the panels 916, 919.

Figure 20:
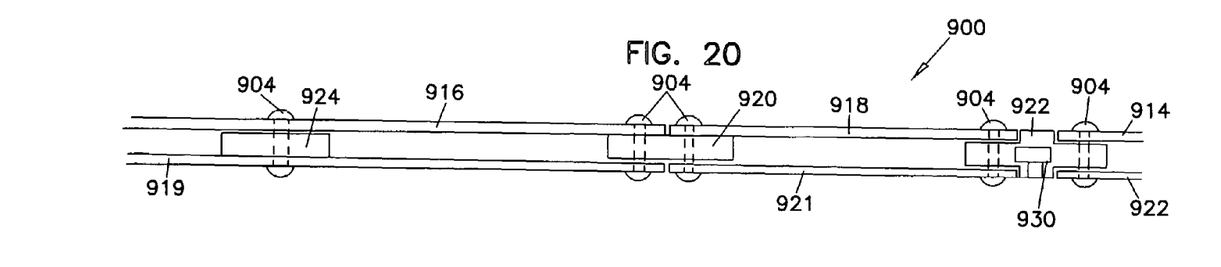
FIG. 20 is a cross-sectional view of another sidewall construction embodiment according to principles of the present invention including a combination of different posts and panel arrangements.

The covered connection post butt joint (see panels 916, 918, 919, 921 coupled to first joining post 920) includes a simple post design that may not include or require any recessed portions to facilitate flush mounting of the panels to the post 920. Post 920 may be made from aluminum, steel, plastic, or other suitable material, and may be solid or hollow depending on the materials used and certain physical requirements such as strength in torsion and bending. For example, post 920 could also be made from a formed sheet or hollow rectangle tube. Sidewall construction 900 has an advantage of having improved flush and smooth surfaces due to the side sheets butting together. As shown in FIG. 20, the covered connection post butt joint arrangement may be combined with other post designs and panel mounting arrangements.

Sidewall construction 1000 shown in FIG. 21 includes a plurality of covered connection posts 1020, 1022, 1024, a plurality of outside panels 1014, 1016, 1018, and a plurality of inside panels 1019, 1021, 1022. The outside panels 1014, 1016, 1018 overlap each other and the inside panels 1019, 1021, 1022 overlap each other at respective connection posts 1020, 1022, 1024. As a result, each posts acts as a connection point for overlapping inside and outside panels. The overlapping panels in sidewall construction 1000 provide added strength and reduce the number fasteners required to assembly the sidewall as compared to the butt joint connection shown with respect to post 920 in FIG. 20 and the two face recess connection shown with respect to post 922 in FIG. 20. Although sidewall construction 1000 does not provide a flush panel arrangement as with other embodiments discussed herein, the overlapping portion of each panel may protrude outward a negligible amount depending on the sheet thickness.

The inside and outside panels of sidewall construction 1000 may be overlapping in a particular order or sequence that is advantageous for a certain design considerations. For example, the outside panels of a semi-trailer sidewall construction preferably have an overlapping arrangement that faces the protruding overlapped edge downwind to reduce drag forces. In another example, the inside panels a container sidewall construction preferably have an overlapping arrangement that faces the protruding overlapped edge toward the front of the container to improve loading conditions (i.e., reduce chances of catching a overlapped edge when loading goods close to the sidewall).

Sidewall construction 1100 provides an alternative overlapping panel arrangement using a plurality of covered posts 1120, 1122, 1124, 1126, 1128, a plurality of outside panels 1114, 1116, 1118, and a plurality of inside panels 1119, 1121, 1122. The overlap of inside and outside panels are staggered from post to post such that no post has more than one panel overlap connection. This configuration may provide many of the same advantages as the sheet overlap connection configuration shown in FIG. 21, but may further provide a wall construction that has a more uniform thickness.

In a yet further sidewall construction embodiment (not shown), the joining posts may include recessed portions on a first side of the post that are sized to receive separate panels in a flush mounted arrangement with an exposed surface of the post, and the opposed second side of the post is not recessed such that panels can be butt mounted against each other when secured to the second side of the post. Other embodiments may include any variation of recesses and unrecessed portions of the posts to provide flush mounting or overlapping mounting of the panels to the post while providing exposed or covered joining and connection posts.

The various posts shown in FIGS. 21–23 can be as wide as necessary for the strength needed (for example, about ¾ inches to about 4 inches) and can be as thick or thin as necessary to provide a desired wall thickness. Also, it may be possible for one sidewall construction to have different posts as needed for the application (for example, see FIG. 20). Wider posts may be used on a portion of the sidewall construction that requires greater strength than other portions of the sidewall construction. Further, additional intermediate posts may be used between the joining posts at portions of the sidewall construction that require greater strength.

The principles of the various sidewall construction examples described above with reference to FIGS. 1–22 may be used in other applications in addition to a semi-trailer (as shown in FIG. 1). One example application for which the sidewall construction of the present invention may be useful is storage containers. Storage containers are available in many different shapes and sizes and are commonly used for storage and transportation of goods. Storage containers typically have some of the same design issues as semi-trailers such as, for example, weight, cost, strength, and maximization of internal volume within a predetermined outer dimension.

An example storage container 1200 is shown in FIG. 23, and includes a similar size and shape as the semi-trailer 8 shown in FIG. 1 with the wheels, suspension, supporting frame, and stand features removed. Other industrial containers may be much smaller, having a size, shape, and materials selection that may be better suited for stationary use, stacking, lifting, repairability, and the like by a commercial or non-commercial user.

Figure 24:
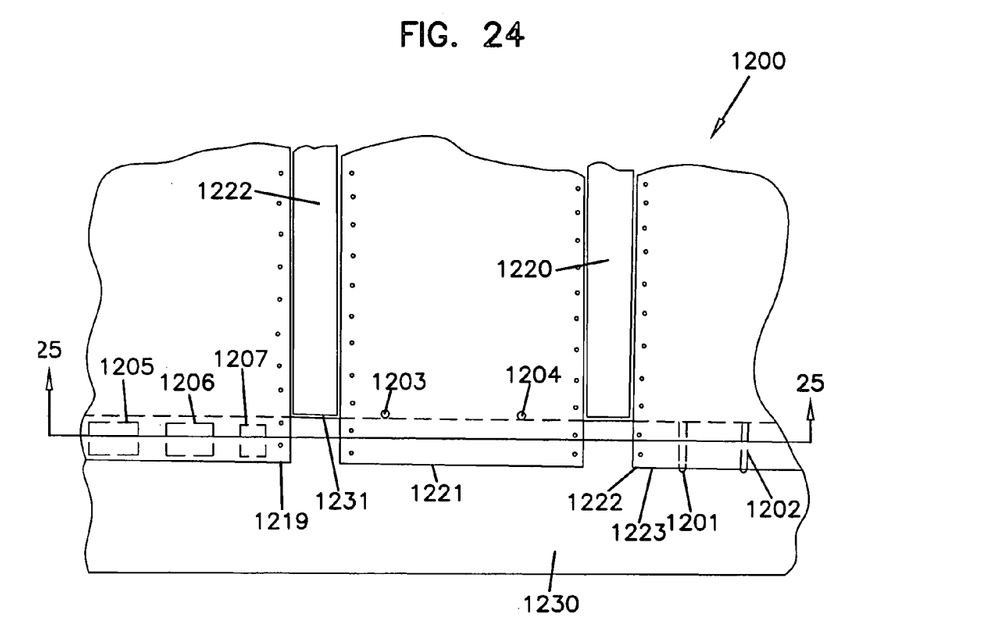
FIG. 24 is a partial front view of another example semi-trailer sidewall construction according to principles of the present invention that includes external draining features.
Figure 25:
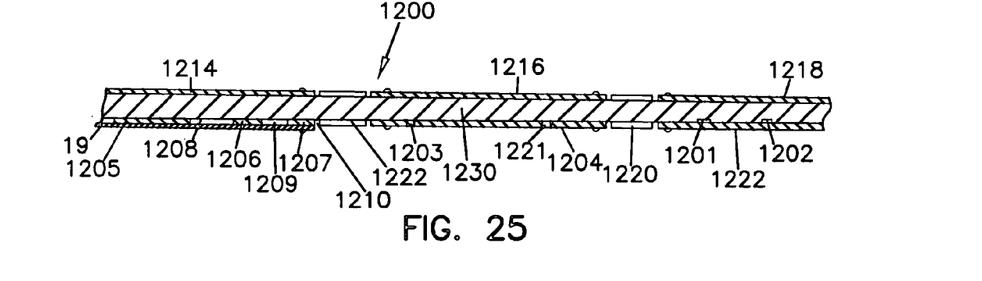
FIG. 25 is a cross-sectional view of the sidewall construction shown in FIG. 24 taken along cross-sectional indicators 25—25.

Referring now to FIGS. 24 and 25, another sidewall construction embodiment 1200 is shown including different drain structures. In a sidewall embodiment in which the space defined between the inside and outside panels is air-filled or otherwise empty (see, for example, the sidewall construction 100 shown in FIG. 3), the bottom rail or an associated transition rail that sits on top of the bottom rail between the inside and outside panels provides a floor for the empty space. In the event that water or other liquid accumulate within the otherwise empty space between the panels, the liquids can drain out of the sidewall construction to an area outside of the sidewall construction.

Sidewall construction 1200 includes inside panels 1214, 1216, 1218, outside panels 1219, 1221, 1222, vertical posts 1220, 1222, and a bottom rail 1230. A first example drain structure associated with sidewall construction 1200 includes first and second draining channels 1201, 1202 that are positioned between the outside panel 1222 and the bottom rail 1230. The channels 1201, 1202 may be formed in an outward facing surface of the bottom rail 1230, as shown in FIG. 25, or may be formed in an inward facing surface at bottom end 1223 of the outside panel 1222. In either embodiment, the channel provides a venting path between a space defined between the inside and outside panels 1218, 1222 and the area outside the sidewall construction 1200.

Another example drain structure includes first and second drain apertures 1203, 1204 formed through the outside panel 1221 at a location just above a top edge 1231 of the bottom rail 1230 or at a top edge of a transition rail (not shown; see, for example, transition rail 130 is FIGS. 2 and 8). Some embodiments may include relatively small one-way valves inserted in the apertures 1203, 1204 that permit liquids to exit but not re-enter the sidewall construction 1200.

A further example drain structure of sidewall construction 1200 includes first, second, and third spacer member 1205, 1206, 1207 positioned between the outside panel 1219 and the bottom rail 1230. The spacer members 1205, 1206, 1207 create gaps or channels 1208, 1209 between the outside panel 1219 and the bottom rail 1230 that provide fluid access from the spaced defined between the outside and inside panels 1219, 1214, respectively, and the area outside the sidewall construction 1200. A single spacer member may used in some embodiments to provide the desired channels along opposing side edges of the spacer member.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A semi-trailer sidewall construction, comprising:
   a horizontally aligned base rail;
   a horizontally aligned top rail;
   a plurality of vertical posts coupled between the top and base rails at spaced apart intervals along a length of the top and base rails, the vertical posts including first and second thicknesses, the first thickness being less than the second thickness, the first post thickness defined by a distance between recessed portions formed in opposing inside and outside primary surfaces of the posts;
   a plurality of outside panels coupled between the top and base rails, separate outside panels being coupled to pain of vertical post within the spaced apart intervals; and
   a plurality of inside panels coupled between the top and base rails, separate inside panels being coupled to pairs of vertical posts within the spaced apart intervals;
   wherein the outside and inside panels are spaced apart a distance defined by the first thickness of the posts.

2. The sidewall construction of claim 1, wherein the outside panels are coupled to the posts in a non-overlapping arrangement relative to adjacent outside panels.

3. The sidewall construction of claim 1, wherein the inside panels are coupled to the posts in a non-overlapping arrangement relative to adjacent inside panels.

4. The sidewall construction of claim 1, wherein an inward facing primary surface of the inside panels is substantially flush mounted with a primary surface of the posts that extends inward most in the trailer.

5. The sidewall construction of claim 1, wherein an outward facing primary surface of the outside panels is substantially flush mounted with a primary surface of the posts that faces outward.

6. The sidewall construction of claim 1, further comprising a spacer member positioned between opposing outside and inside panel within the spaced interval, the spacer having a thickness substantially equal to the first post thickness.

7. The sidewall construction of claim 1, wherein the vertical posts include a flashing recess formed in a bottom end of the posts, the flashing recess being sized to receive a flashing member.

8. The sidewall construction of claim 1 wherein the recessed portions are recessed an amount substantially equal to a thickness of the inside and outside panels that are mounted in the respective recessed portions.

9. The sidewall construction of claim 1, wherein the second post thickness is defined by a distance between an outer most surface and an innermost primary surface of the posts.

10. The sidewall construction of claim 1, wherein the lower rail includes a plate member, the plate member being coupled between the inside and outside panels.

11. The sidewall construction of claim 10, wherein the plate member has a width/height of about 18 to about 30 inches.

12. The sidewall, construction of claim 1, wherein the sidewall construction has a total thickness of about 0.25 to 2 inches.

13. The sidewall construction of claim 1, wherein the sidewall construction has a total thickness of about 0.5 inches.

14. The sidewall construction of claim 1, wherein the first post thickness is about 0.4 inches, the second post thickness is about 0.5 inches, and the outside and inside panels have a thickness of about 0.04 to 0.05 inches.

15. The sidewall construction of claim 1, further comprising an intermediate horizontal rail extending between two of the plurality of posts in the spaced interval vertically between the top and base rails, the intermediate rail including inside and outside primary surfaces and a reduced thickness portion substantially equal to the post first thickness.

16. The sidewall construction of claim 15, wherein a portion of the intermediate rail is exposed adjacent the inside or outside panels, includes a hollow core, and includes an aperture formed in the inside or outside primary surface that provides access into the hollow core.

17. The sidewall construction of claim 1, further comprising an drain structure configured to provide a fluid passage that extends from the spaced apart area defined between the outside and inside panels to an area outside the sidewall construction.

18. The sidewall construction of claim 17, wherein the drain structure is a channel formed in the base rail.

19. The sidewall construction of claim 17, wherein the drain structure is an aperture fanned in a bottom edge of one of the inside or outside panels.

20. The sidewall construction of claim 17, wherein the drain structure is a channel defined between one of the outside or inside panels and the base rail by a spacer member positioned between the base rail and the one outside or inside panel.

21. The sidewall construction of claim 1, wherein one of the outside panels and an opposing one of the inside panels are coupled to the post with a plurality of fasteners, each fastener extending through the outside and inside panels and one of to vertical posts.

22. The sidewall construction of claim 21, wherein the plurality of fasteners extend through the recessed portions of the vertical post.

23. A semi-trailer sidewall construction, comprising:
a vertically oriented post including first and second thicknesses, the first thickness being less than the second thickness and defined by a distance between recessed portions formed in opposing inside and outside primary surfaces of the post;
an outside panel coupled to the post within the recessed portion formed in the outside primary surfaces of the post; and
an inside panel coupled to the post within the recessed portion formed in the inside primary surface of the post;
wherein the outside and inside panels are spaced apart a distance defined by the first thickness of the post.

24. The sidewall construction of claim 23, wherein an inward facing primary surface of the inside panel is substantially flush mounted with a primary surface of the post that extends inward most in the trailer.

25. The sidewall construction of claim 23, wherein an outward facing primary surface of the outside panel is substantially flush mounted with a primary surface of the post that faces outward.

26. The sidewall construction of claim 23, further comprising a spacer member positioned between opposing outside and inside panels, the spacer having a thickness substantially equal to the first post thickness.

27. The sidewall construction of claim 23, wherein the vertical post include a flashing recess formed at a bottom end of the post, the flashing recessed being sized to receive a flashing member.

28. The sidewall construction of claim 23, wherein the recessed portions are recessed an amount substantially equal to a thickness of the inside and outside panels.

29. The sidewall construction of claim 23, wherein the second post thickness is defined by a distance between an outer most surface and an inner most primary surface of the posts.

30. The sidewall construction of claim 23, wherein the sidewall construction has a total thickness of about 0.25 to about 2 inches.

31. The sidewall construction of claim 23, wherein the sidewall construction has a total thickness of about 0.5 inches.

32. The sidewall construction of claim 23, wherein the first post thickness is about 0.4 inches, the second post thickness is about 0.5 inches, and the outside and inside panels have a thickness of about 0.04 to about 0.05 inches.

33. The sidewall construction of claim 23, further comprising a drain structure configured to provide a fluid passage that extends from between the spaced the outside and inside panels to an area outside the sidewall construction.

34. The sidewall construction of claim 33, wherein the drain structure is an aperture fromed in a bottom edge of one of the inside or outside panels.

35. The sidewall construction of claim 23, wherein the outside and inside panels are coupled to the post with a plurality of fasteners, each fastener extending through the outside and inside panels and the vertical post.

36. The sidewall construction of claim 35, wherein the plurality of fasteners extend through the recessed portions of the post.

* * * * *

UNITED STATES PATENT AND TRADEMARK OFFICE
CERTIFICATE OF CORRECTION

| | | |
|---|---|---|
| PATENT NO. | : 7,014,253 B2 | Page 1 of 1 |
| APPLICATION NO. | : 10/823505 | |
| DATED | : March 21, 2006 | |
| INVENTOR(S) | : Oren | |

It is certified that error appears in the above-identified patent and that said Letters Patent is hereby corrected as shown below:

Col. 12, line 21, claim 1: "coupled to pain" should read --coupled to pairs--

Col. 13, line 28, claim 19: "aperture fanned in a" should read --aperture formed in a --

Col. 14, line 43, claim 34: "aperture fromed in a" should read --aperture formed in a--

Signed and Sealed this

Fourth Day of July, 2006

JON W. DUDAS
*Director of the United States Patent and Trademark Office*